United States Patent
Monahan

(10) Patent No.: US 10,427,753 B1
(45) Date of Patent: Oct. 1, 2019

(54) METHOD AND APPARATUS FOR SECURING FOOT TO PEDAL WITH STRAP SECURED TO AXLE

(71) Applicant: James Patrick Monahan, Denver, CO (US)

(72) Inventor: James Patrick Monahan, Denver, CO (US)

( * ) Notice: Subject to any disclaimer, the term of this patent is extended or adjusted under 35 U.S.C. 154(b) by 0 days.

(21) Appl. No.: 16/150,671

(22) Filed: Oct. 3, 2018

Related U.S. Application Data

(60) Provisional application No. 62/567,764, filed on Oct. 4, 2017.

(51) Int. Cl.
*B62M 3/08* (2006.01)

(52) U.S. Cl.
CPC .................. *B62M 3/083* (2013.01)

(58) Field of Classification Search
CPC ........ B62M 3/08; B62M 3/083; B62M 3/086; B62M 3/16
USPC ....................................... D12/125
See application file for complete search history.

(56) References Cited

U.S. PATENT DOCUMENTS

| | | | |
|---|---|---|---|
| 859,684 A * | 7/1907 | McMonies | B62M 3/086 74/594.6 |
| 3,960,027 A | 6/1976 | Magnuson | |
| D275,846 S * | 10/1984 | Buchanan, Jr. | D12/125 |
| 4,599,914 A | 7/1986 | Dunn | |
| D286,993 S * | 12/1986 | Kotamaki | D12/125 |
| D302,259 S * | 7/1989 | Konzorr | D12/125 |
| 4,856,211 A | 8/1989 | Phillips | |
| 4,953,425 A | 9/1990 | Barefoot | |
| 5,078,026 A | 1/1992 | Giffin | |
| 6,035,743 A * | 3/2000 | Gapinski | B62M 3/083 36/131 |
| 6,393,941 B1 * | 5/2002 | Liu | B62M 3/083 74/594.4 |
| 2004/0007090 A1 * | 1/2004 | Liou | B62M 3/083 74/594.6 |
| 2013/0125702 A1 * | 5/2013 | Lin | B62M 3/083 74/594.6 |

FOREIGN PATENT DOCUMENTS

| | | | |
|---|---|---|---|
| KR | 101514315 B1 * | 9/2013 | |
| KR | 1020150026351 A * | 3/2015 | |

OTHER PUBLICATIONS

Power Grips Pedal Kit; http://www.powergrips.com/pedal-kits/ (Year: 2015).*

(Continued)

*Primary Examiner* — Adam D Rogers
(74) *Attorney, Agent, or Firm* — Patent Law Offices of Rick Martin, P.C

(57) ABSTRACT

A bicycle pedal strap front flange securing means to a front face of a pedal such as a nut and bolt fastener. A base extends forward and outbound from a top edge of the front flange. A diagonal strap extends from the front of the baselock to the axle. The diagonal strap has an inbound end with a hole that must be inserted around the axle before the axle is threaded onto the crank arm. A one piece plastic or rubber construction is included. A multi-piece leather embodiment is included. A dual diagonal strap embodiment is included. A buckle strap embodiment is included.

17 Claims, 13 Drawing Sheets

(56) References Cited

OTHER PUBLICATIONS

Garmin Vector 3.
Design U.S. Appl. No. 29/665,430, filed Oct. 3, 2018. Inventor James Patrick Monahan.
Wholesale Fitness&excercise Equipment Pedals-Me Young Sports-Product Center-MeYoung sporting Goods Co.,Ltd—meyoungsports.com/product-31.html Pedal JD-48A.
Wholesale Fitness&excercise Equipment Pedals-Me Young Sports-Product Center-MeYoung sporting Goods Co.,Ltd—meyoungsports.com/product-31.html Pedal JD-2A.
Wholesale Fitness&excercise Equipment Pedals-Me Young Sports-Product Center-MeYoung sporting Goods Co.,Ltd—meyoungsports.com/product-31.html Pedal JD-3A.

\* cited by examiner

METHOD AND APPARATUS FOR SECURING FOOT TO PEDAL WITH STRAP SECURED TO AXLE

CROSS REFERENCE APPLICATIONS

This non-provisional application claims priority to provisional application no. 62/567,764 filed on Oct. 4, 2017 which is incorporated by reference herein in its entirety.

FIELD OF THE INVENTION

The present invention relates to pedal straps to be used with pedals primarily bicycles, alternately could be used with unicycles, tricycles, other Human Powered Vehicles with plurality of wheels, exercise equipment, stationary bicycles or other applications that use foot pedals.

BACKGROUND

Disclosure of Prior Art:

Multiple methods and apparatus have been developed to secure a bicyclist's feet to pedals for additional power when pedaling. Existing solutions are not optimal for all situations. Some are expensive or too costly to manufacture efficiently, require special shoes be worn, lack the security needed for powerful pedaling, or require a custom made pedal. Another problem with existing solutions is that they secure the foot to the pedal but are challenging for beginners to use. The idea of having your foot secured to the pedal can be intimidating to some cyclists because it can be hard to quickly release and remove your foot from the pedal strap. The inability to quickly release and remove your foot can be dangerous for both beginner and experienced cyclists.

A Brief Summary of Known Prior Art Follows:

U.S. Pat. No. 4,953,425 discloses a diagonal toe strap with traditional bolt mounts.

U.S. Pat. No. 5,078,026 discloses a toe clip fastened to the front of the pedal and then strapped around the rear of the pedal.

U.S. Pat. No. 4,599,914 discloses a hook and loop fabric strap.

U.S. Pat. No. 4,856,211 discloses a fabric toe strap with a heel strap.

U.S. Pat. No. 3,960,027 discloses a bottom of pedal mounted heel support strap.

Garmin Vector 3 discloses a custom pedal.

KR 101514315 and KR 20150026351 disclose a front pedal extension to increase driving force.

Power Grips Pedal Kit does have a diagonal strap, but it is mounted with traditional bolts and screws.

Fitnesspartswholesale.com discloses a custom pedal with a circular hole on the strap that goes around the axle. But a custom pedal needs an anchor on the outer side.

Embodiments of the present invention provide solutions to these and other issues surrounding the securing and releasing of a cyclist's foot to the pedal.

BRIEF SUMMARY OF THE INVENTION

The main aspect of the present invention is to provide a device to secure a foot (with or without shoe) to a pedal that increases a cyclist's power, allows for easy and quick release, doesn't require additional equipment (like special shoes), and is intuitive to mount to existing or new pedals.

Other aspects of this invention will appear from the following description and appended claims, reference being made to the accompanying drawings forming a part of this specification wherein like reference characters designate corresponding parts in the several views.

In one embodiment, an apparatus to secure a foot or feet to pedal(s) is provided. The apparatus is comprised of a plastic strap that is mounted to the pedal(s) in a single or plurality of locations on the front face of the pedal platform, contains a flat surface that extends from the mounting location on the same (or similar) plate of the top of the pedal and extends a distance to accommodate a standard foot and then turns upward and creates a diagonal arc from the front of the foot on the opposite side of crank and creates an arc that passes over a foot and is secured to the axle located between the pedal platform and the pedal crank. The preferred embodiment includes two, single body, unidirectional clips (one each left and right foot) and a plurality of fasteners for the front of the pedal.

In another embodiment, an apparatus to secure a foot or feet to pedal(s) is provided. The apparatus is comprised of a plastic strap that is mounted to the pedal(s) in a plurality of locations on the front face of the pedal platform, contains a flat surface that extends from the mounting location on the same (or similar) plate of the top of the pedal and extends a distance to accommodate a standard foot and then turns upward and creates a diagonal arc from the front of the foot on the opposite side of crank and creates an arc that passes over a foot. A second body is secured to the axle located between the pedal platform and the pedal crank, additionally there is an attachment mechanism that allows for secure and adjustable attachment. Having two separate bodies allows for an adjustable length arc to provide better fit for various sized feet. This embodiment includes two, multi body, unidirectional clips (one each for left and right foot) and plurality of fasteners.

In another embodiment, an apparatus to secure a foot or feet to pedal(s) is provided. The apparatus is comprised of a plastic strap that mounted to the pedal(s) in a plurality of locations on the front face of the pedal, platform, contains a flat surface that extends from the mounting location on the same (or similar) plate at the top of the pedal and extends a distance to accommodate a standard foot and then turns upward and creates a diagonal arc from the front of the foot on the opposite side of crank and creates an arc that passes over a foot. A second body is secured to the axle located between the pedal platform and the pedal crank, additionally the part is manufactured from a flexible material, such as a thermoplastic elastomer or rubber, and is designed in a way that the part is "reversible" allowing one part to work for both a left or right sided pedal.

In another embodiment, an apparatus, to secure a foot or feet to pedal(s) is provided. The apparatus is comprised of a strap that is mounted to the pedal(s) in a plurality of locations on the front face of the pedal platform, contains a flat surface that extends from the mounting location on the same (or similar) plate of the top of the pedal and extends a distance to accommodate a standard foot and then turns upward and creates a diagonal arc from the front of the foot on the opposite side of crank and creates an arc that passes over a foot. A second body is secured to the axle located between the pedal platform and the pedal crank. This part could be fabricated or manufactured from many materials including plastic, metal, fabric or composite material.

Other embodiments of the present invention may be integral to the pedal platform with a plane that extends beyond the front of the platform and turns up to create an arc over the foot and is attached to the pedal near, or at, the axle between the platform and the pedal crank.

BRIEF DESCRIPTION OF THE DRAWINGS

The present invention is described in conjunction with the appended figures (the invention includes two symmetrical components, FIGS. 1A, 1B and 2 show both the left and right. Because the features are identical mirror images and because the components are identical in form and function, and to add clarity, the other images may only include one component. Any features or details exist on both components.

Before explaining the disclosed embodiments in detail, it is to be understood that the embodiments are not limited in application to the details of the particular arrangements shown, since other embodiments are possible. Also, the terminology used herein is for the purpose of description and not of limitation.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE DRAWINGS

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention. Specific details are given in the following description to provide a thorough understanding of the embodiments. However, it will be understood by one of ordinary skill in the art that the embodiments may be practiced without these specific details.

In one embodiment of the invention, an apparatus for securing a foot to a pedal is provided. The apparatus is comprised of a single component for each pedal. There are commonly two mirror image components which is fabricated or manufactured of a durable material. The apparatus is sized to fit a common bicycle pedal with mounting locations at the front and a securing point at the pedal axel. The strap arches upward from he front mounting location to a height that accommodates a human foot or shoe and wraps over the foot and is secured to the pedal axel.

In another embodiment of the invention, an apparatus for securing a foot to a pedal is provided. The apparatus is comprised of a single component for each pedal. There two identical components with a flexible strap that allows the device to be "reversible" to mount to either a left or right pedal, which is fabricated or manufactured of a durable material. The apparatus is sized to fit a common bicycle pedal with mounting locations at the front and a securing point at the pedal axle. The strap arches upward from the front mounting location to a height that accommodates a human foot or shoe and wraps over the foot and is secured to the pedal axel.

Figure 1:
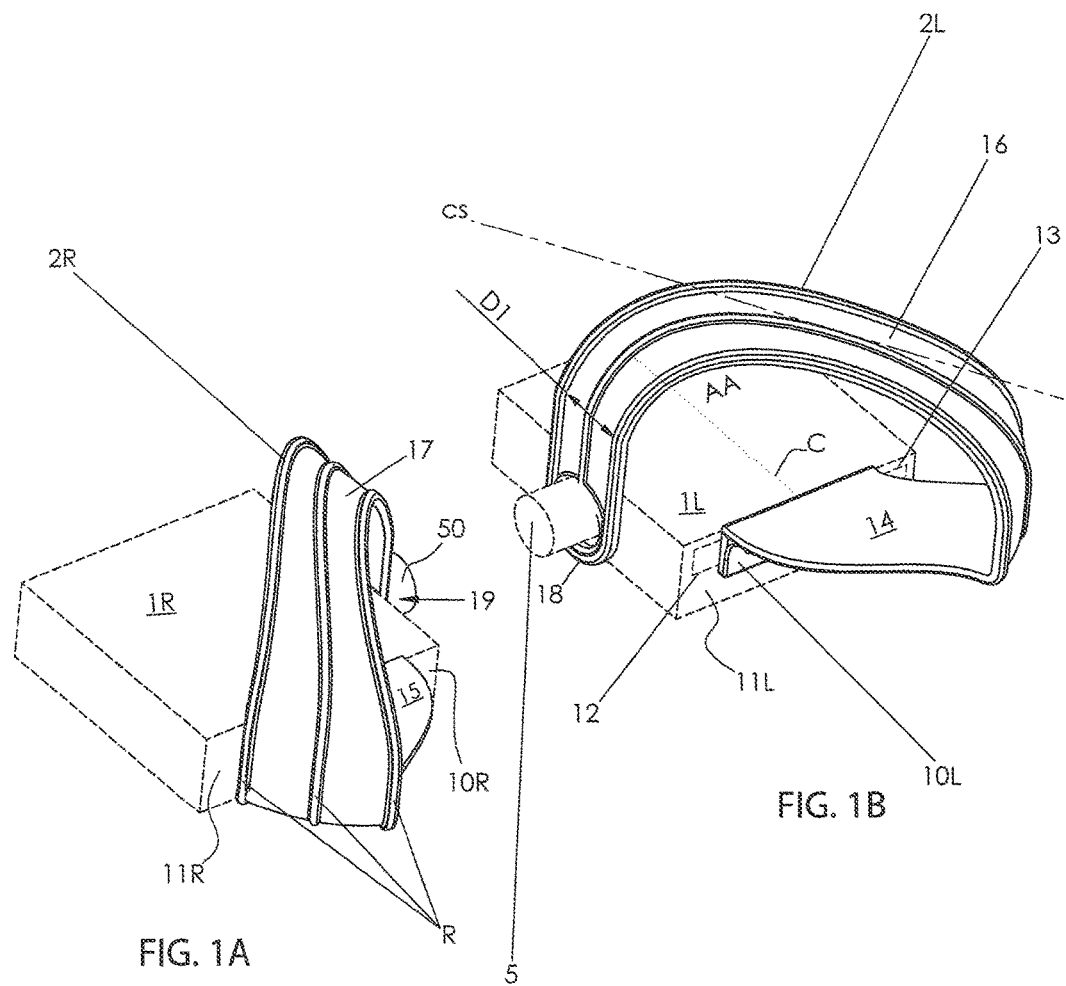
FIG. 1A is a front perspective view of an axle strap for the right pedal.
FIG. 1B is a front perspective view of an axle strap for the left pedal.
Figure 2:
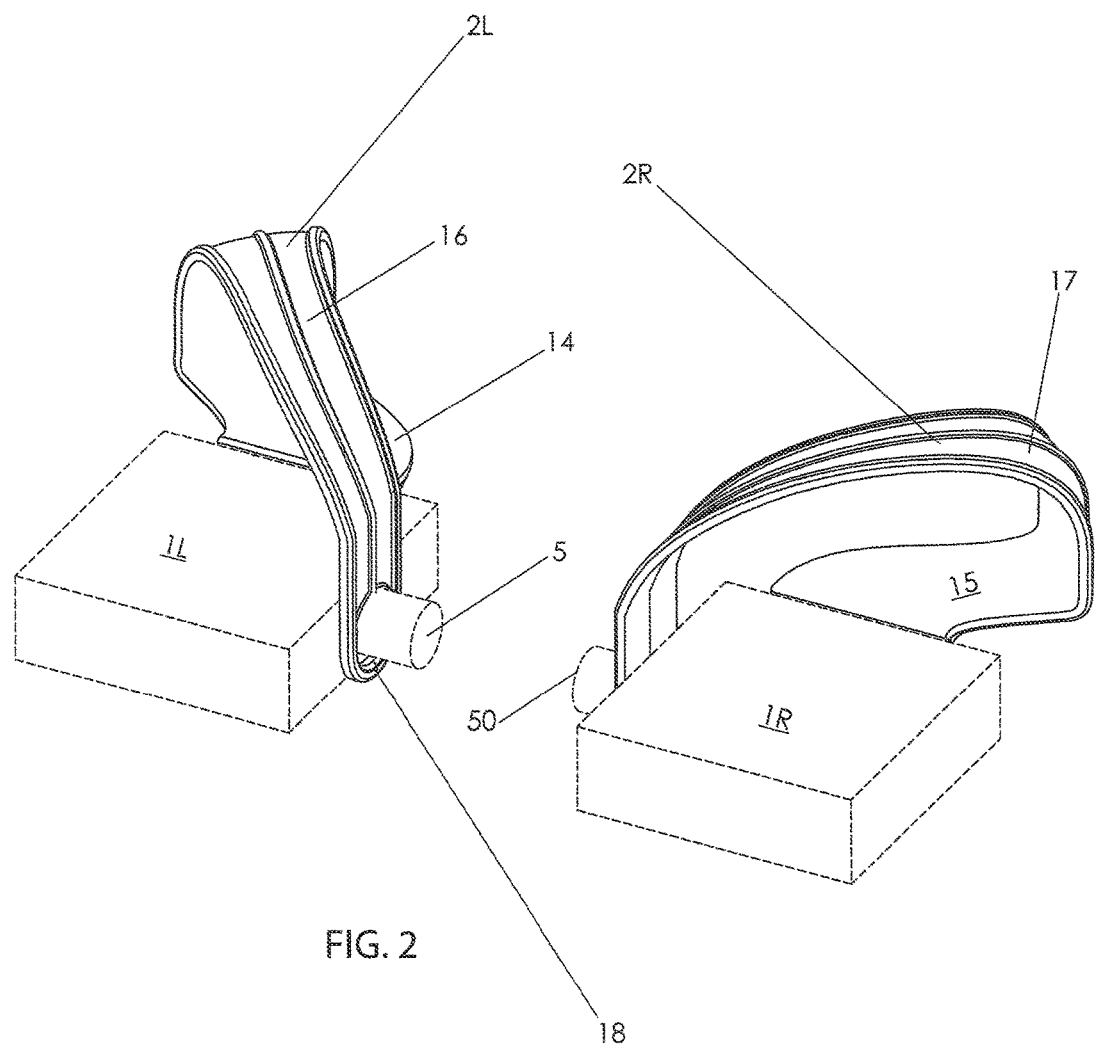
FIG. 2 is a rear perspective view of the straps shown in FIGS. 1A, 1B.

Referring first to FIGS. 1A, 1B, 2 a standard left bike pedal 1L has an axle 5 that threads into a crank arm (not shown). A right bike pedal 1R has an axle 50 that threads into a crank arm 3, FIG. 11. A left axle strap 2L is a mirror image of the right axle strap 2R. Each axle strap has a rigid front flange 10L, 10R which can be bolted or zip tied or hooked loop or taped to tine respective pedal fronts 11L, 11R. FIG. 1B shows the front flange 10L mounted center to the longitudinal axis C of the pedal 1L. However, for comfort and/or performance reasons, the front flange 10L could be mounted inward at dots 12 or outbound at dots 13. Such orientations would change the angle AA of orientation of the centerline axis CS of the pedal 1L to axis C.

Each strap has a rigid forward projecting base 14,15 that secures the diagonal strap portions 16,17. The diagonal strap portions end with axle loops 18, 19. The preferred embodiment casts all strap components 10L, 14, 16,18 as one casting from any polymeric material from rubber to a rigid plastic. If a leather strap segment 16 were used, then base 14 and front flange 10L could be reinforced, and a metal ring added to the strap. See FIG. 4 item 190. The ridges R are optional. A plastic strap 2L could be about 0.125 inches thick (3.175 mm) (about 0.100 to about 0.150 inch). The term "thick" means a depth from a top to a bottom surface of the plastic strap 2L. Dimension D1 (width) could range from about 0.50 (12.7 mm) to about 1.5 inch (38.1 mm).

Figure 3:
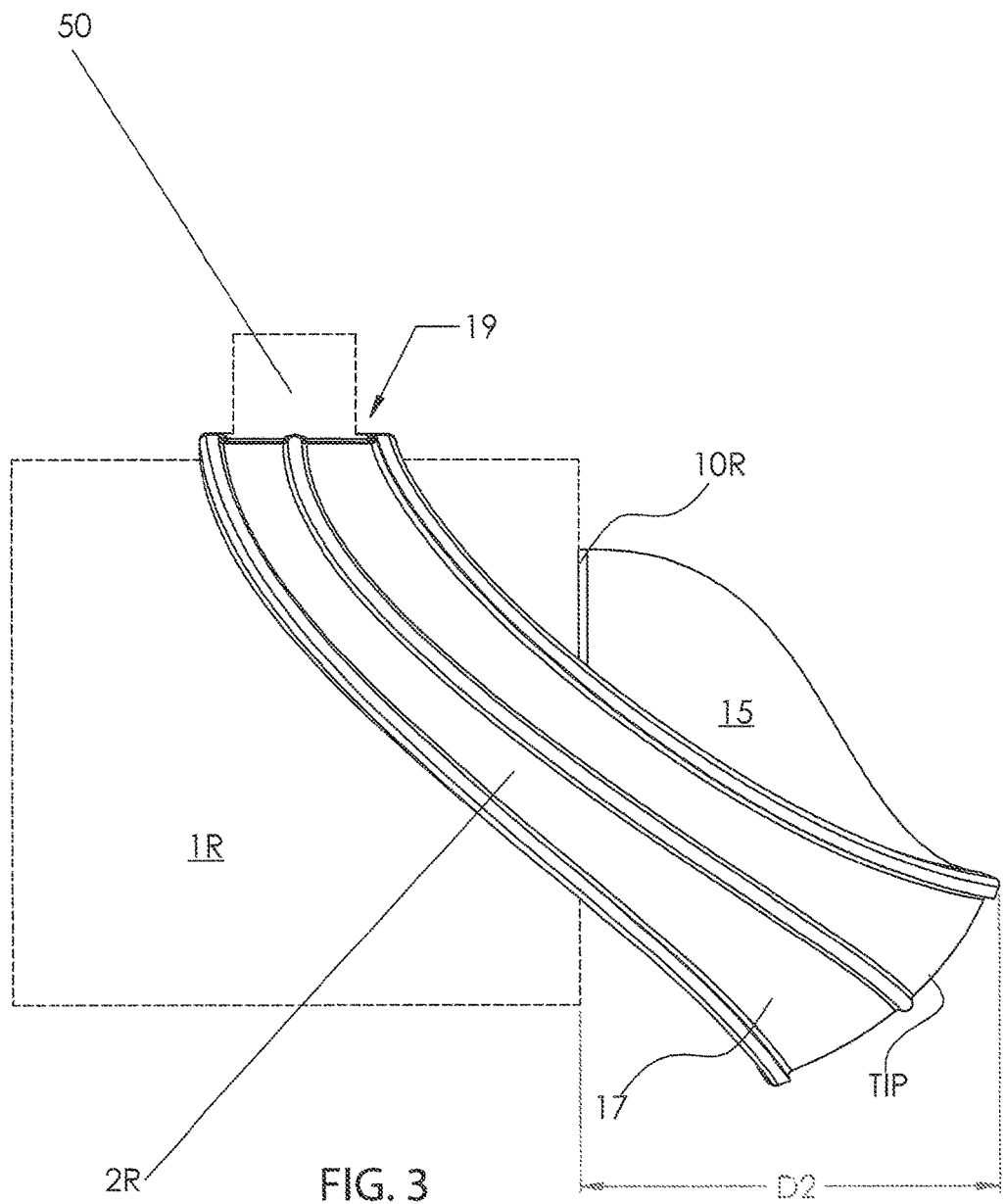
FIG. 3 is a top plan view of the axle strap shown in FIG. 1B.

FIG. 3 shows a top plan view of the right axle strap 2R. Nominal distance d2 can range from about 2.25 inch (57.15 mm) to about 2.75 inch (68.9 mm). The front or the strap 1R is designated TIP, and it cannot hit the front wheel or scrape the ground.

Figure 4:
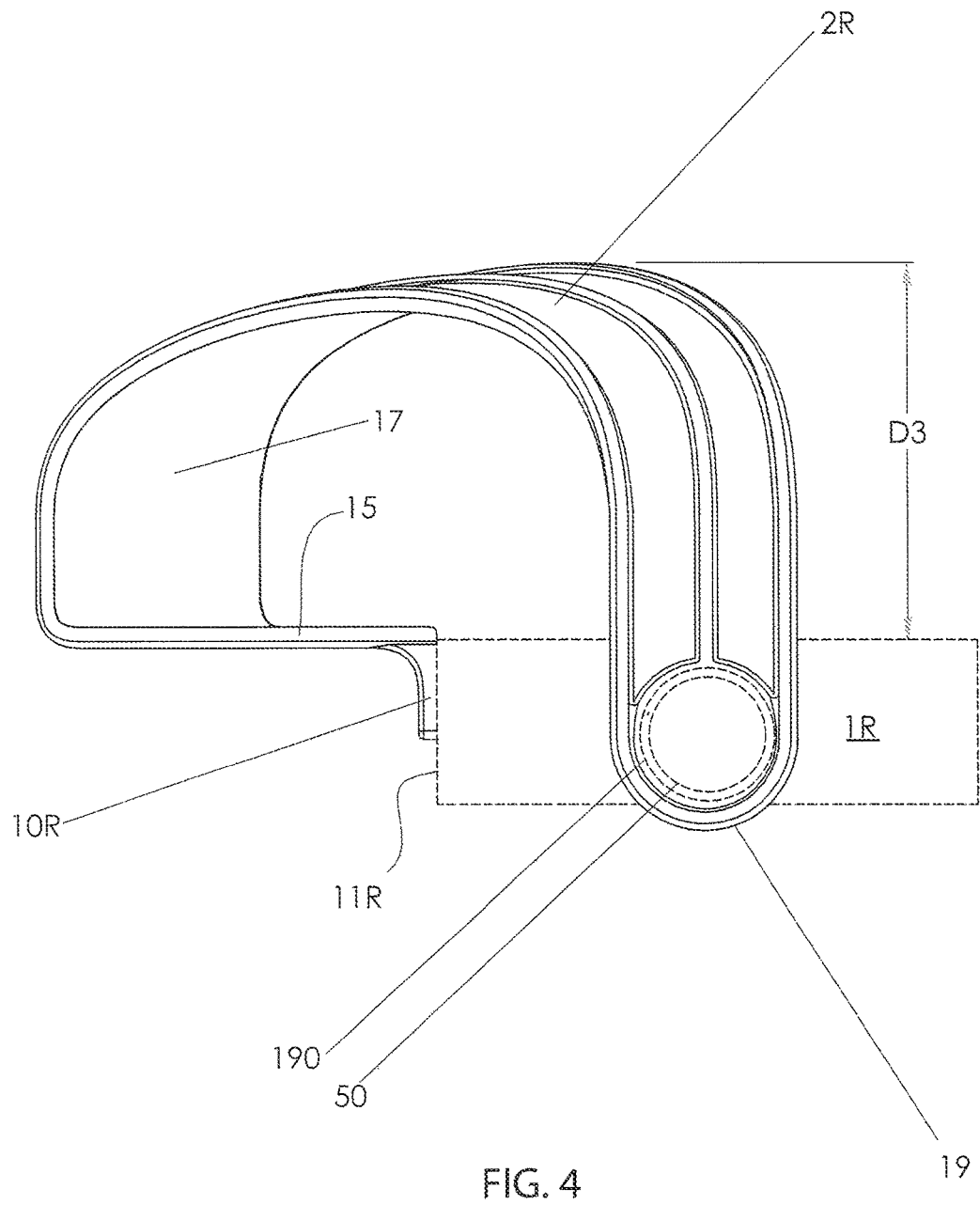
FIG. 4 is an axle side elevation view of the axle strap shown in FIG. 1A.

FIG. 4 shows an inside to outside elevation view of the right axle strap 2R. The axle loop 19 may or may not be concentric with the round axle 50.

Figure 5:
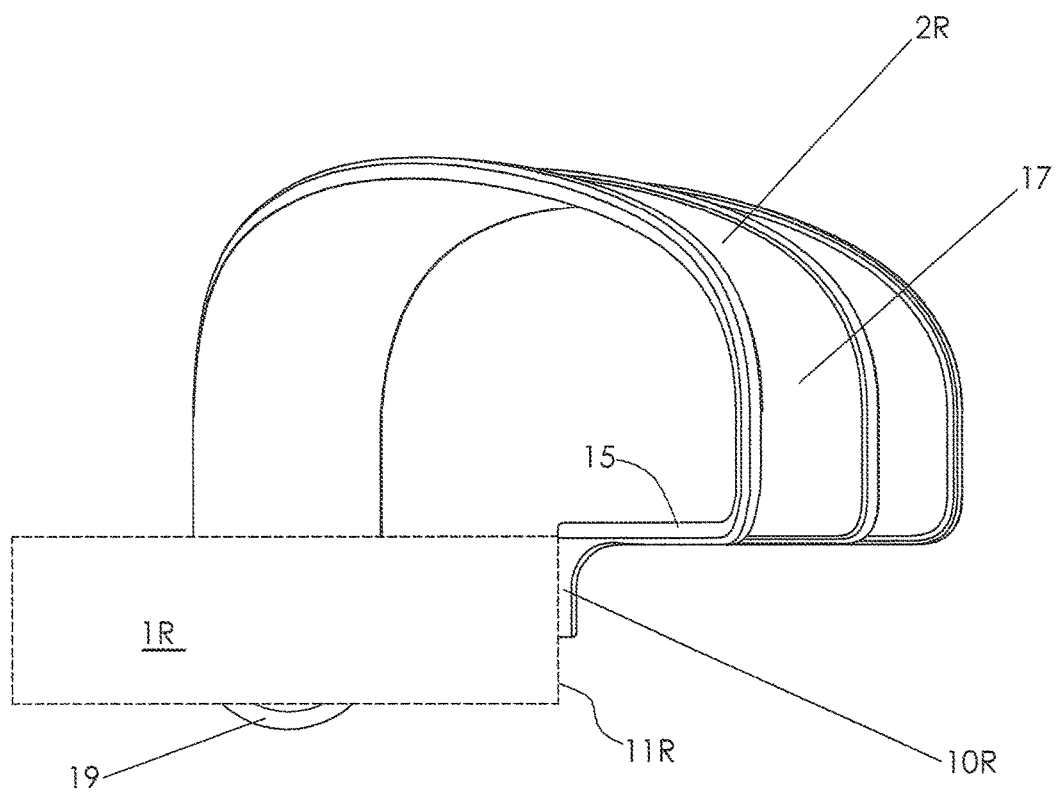
FIG. 5 is an exterior side elevation view opposite that shown in FIG. 4.

FIG. 5 shows an outside to inside elevation view of the right axle strap 2R.

Figure 6:
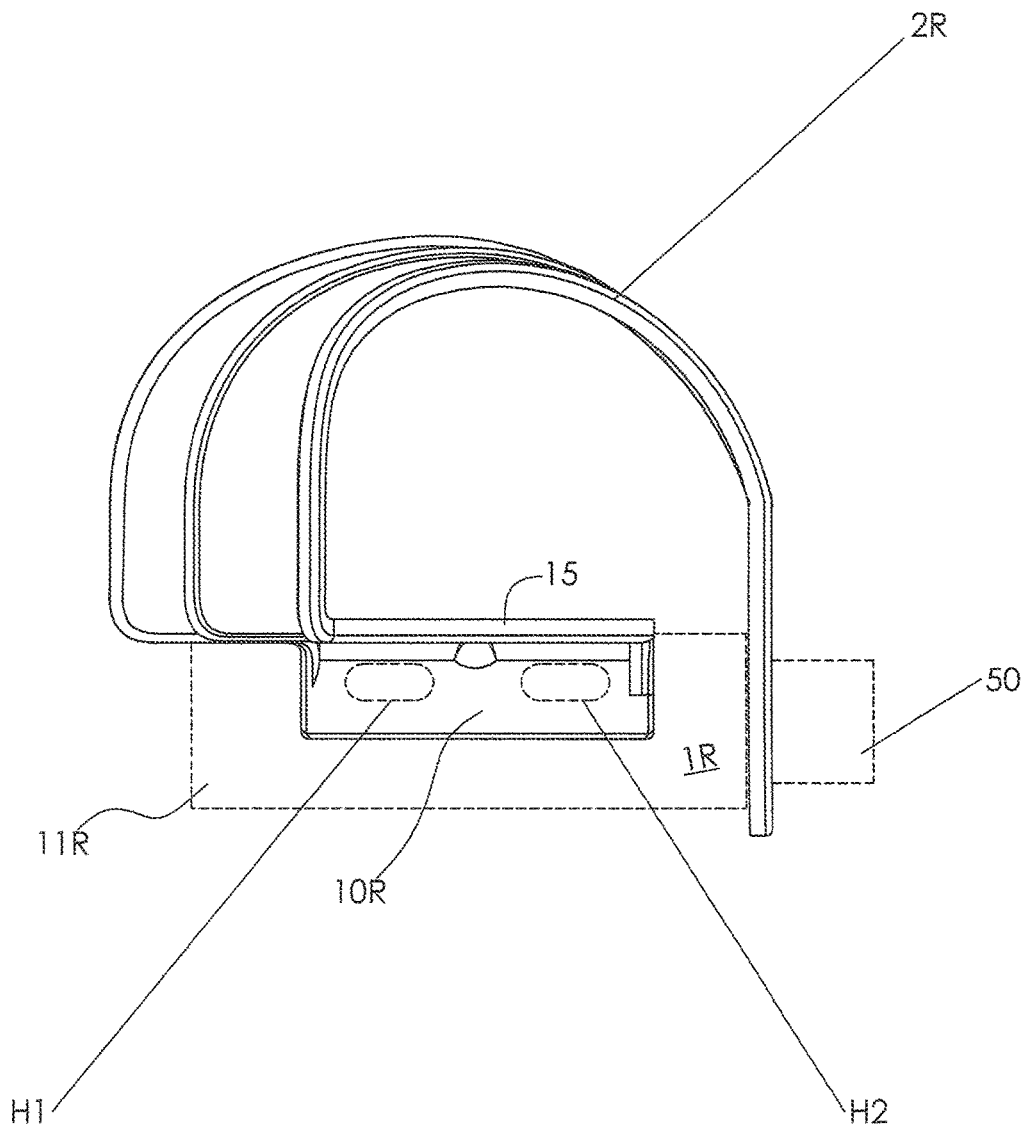
FIG. 6 is a front elevation view of the embodiment shown in FIG. 1A.

FIG. 6 shows a front elevation view of the right axle strap 2R. The holes H1, H2 in front flange 10R can be used to receive a standard bolt and nut anchor.

Figure 7:
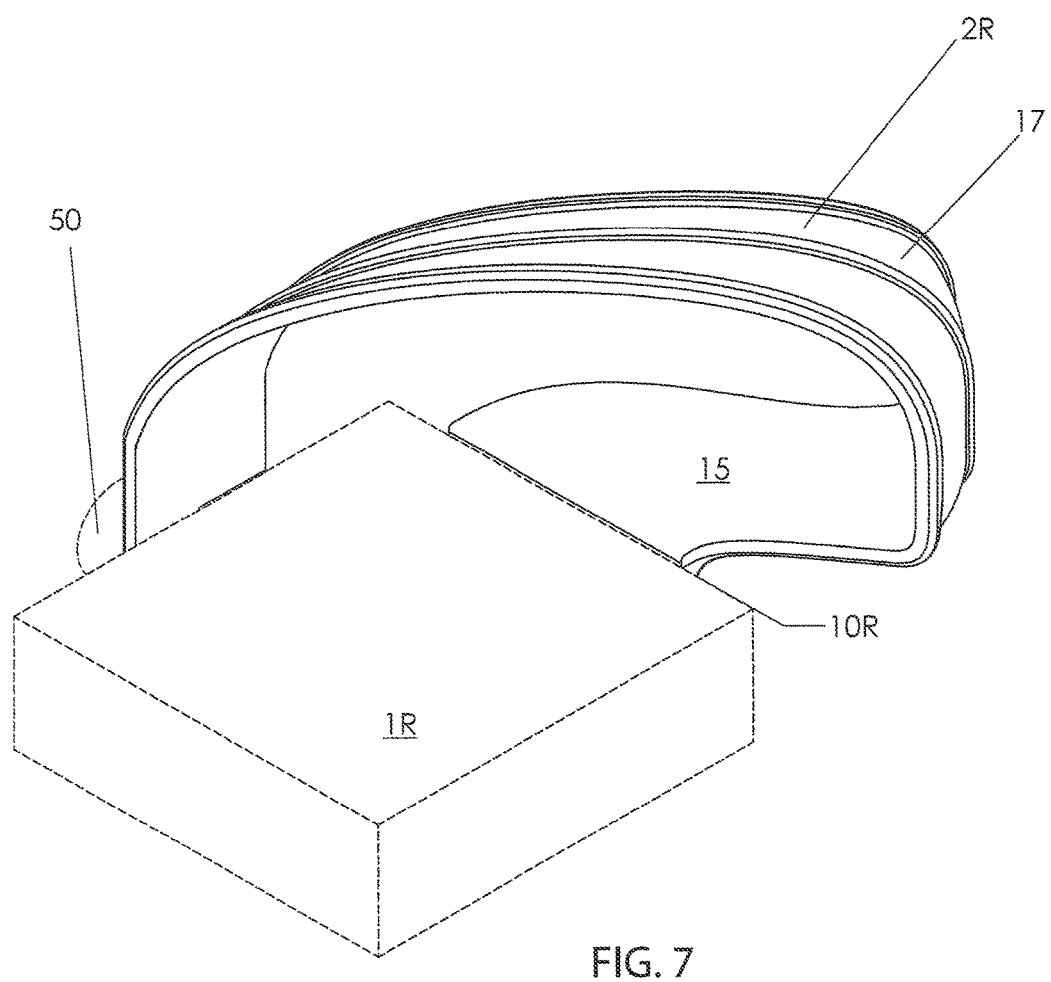
FIG. 7 is a rear perspective view of the embodiment shown in FIG. 1A.

FIG. 7 shows a rear perspective view of the right axle strap 2R.

Figure 8:
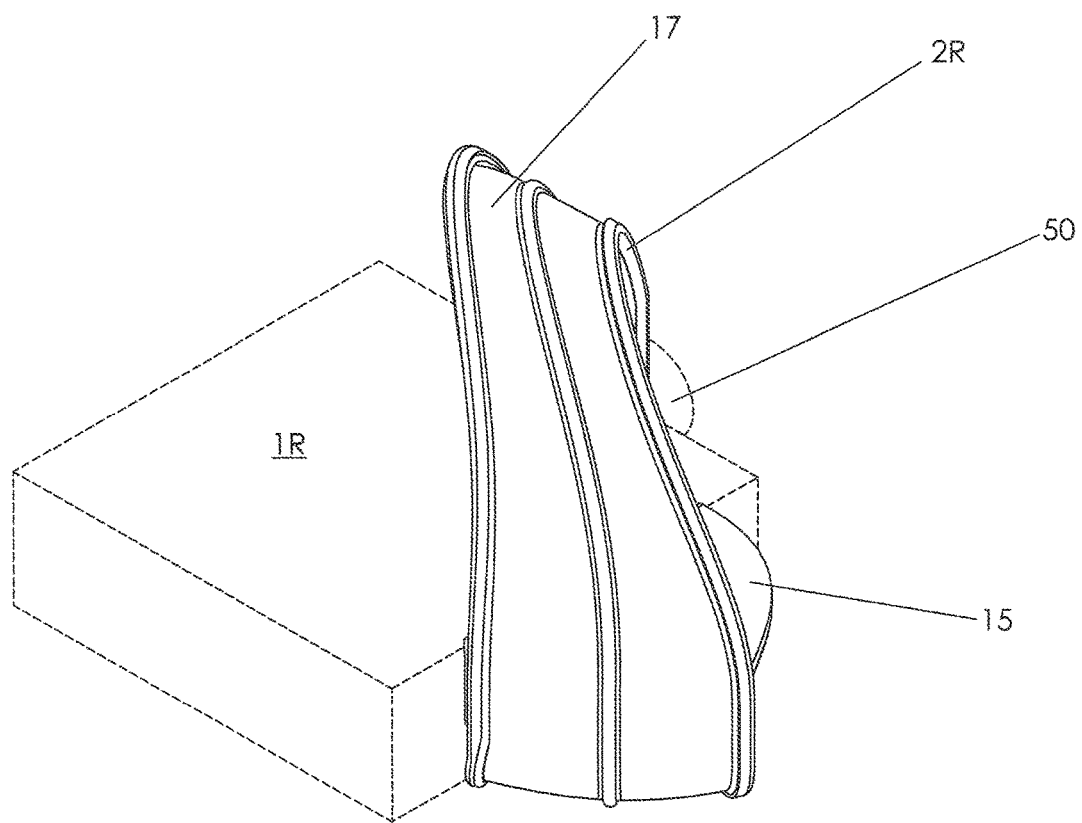
FIG. 8 is a front top perspective view of the embodiment shown in FIG. 1A.

FIG. 8 shows a front perspective view of the right axle strap 2R.

Figure 9:
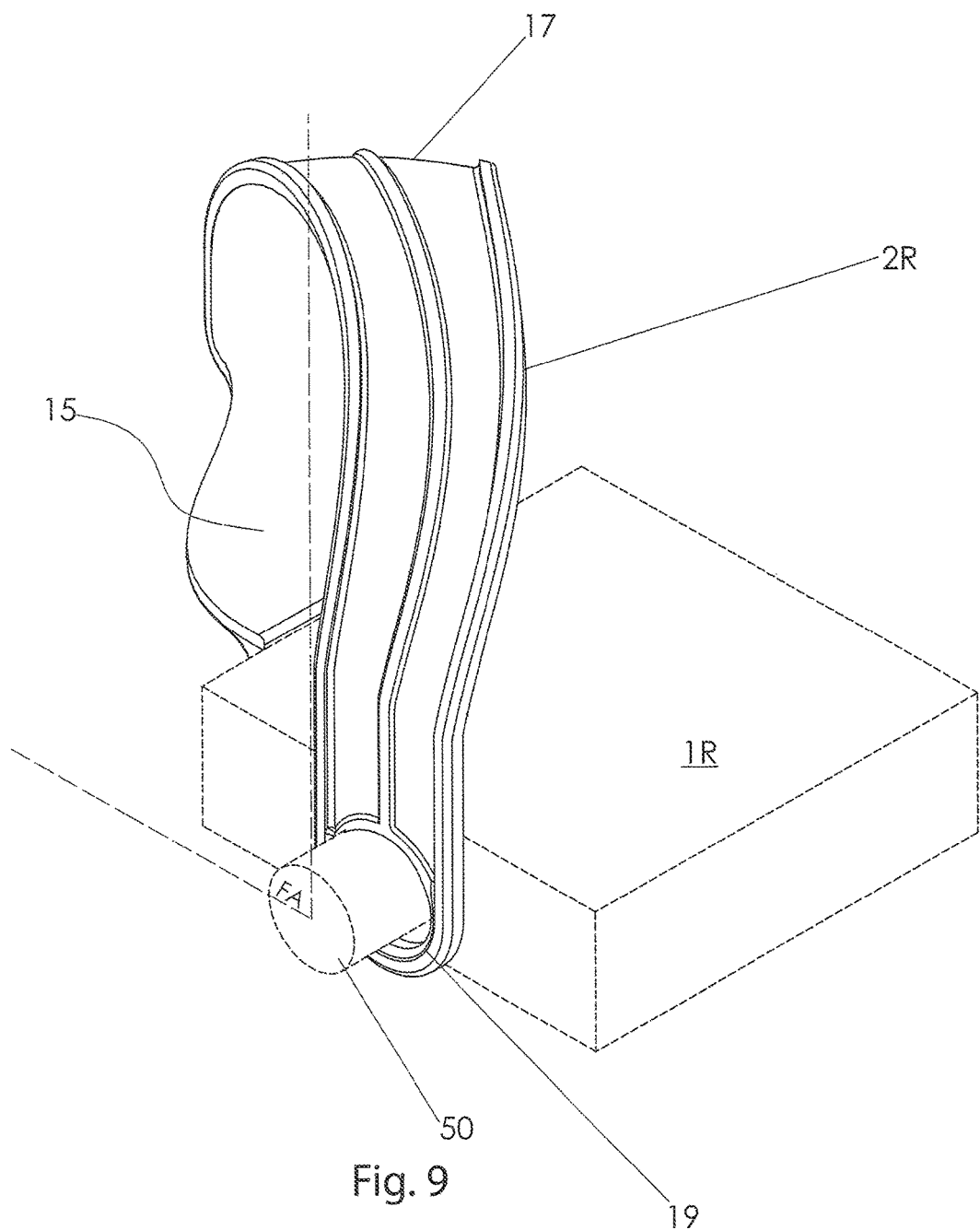
FIG. 9 is a rear perspective view of the embodiment shown in FIG. 1A.

FIG. 9 shows a rear perspective view of the right axle strap 1R.

Figure 10:
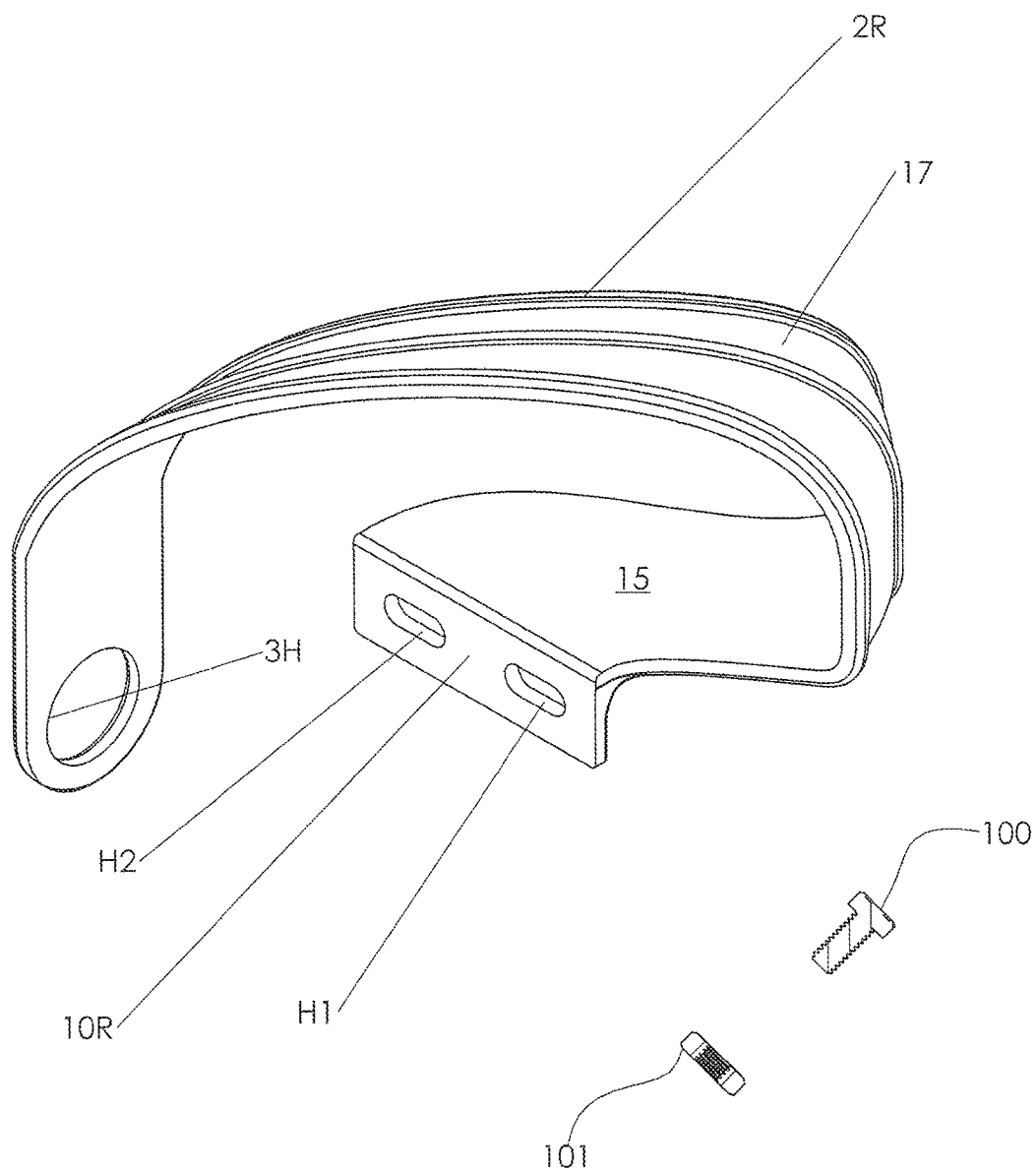
FIG. 10 is a rear perspective view of the embodiment shown in FIG. 1A before mounting to the right pedal.

FIG. 10 shows a rear perspective view of right axle strap 2R and bolt 100 and nut 101, one each for holes H1, H2.

Figure 11:
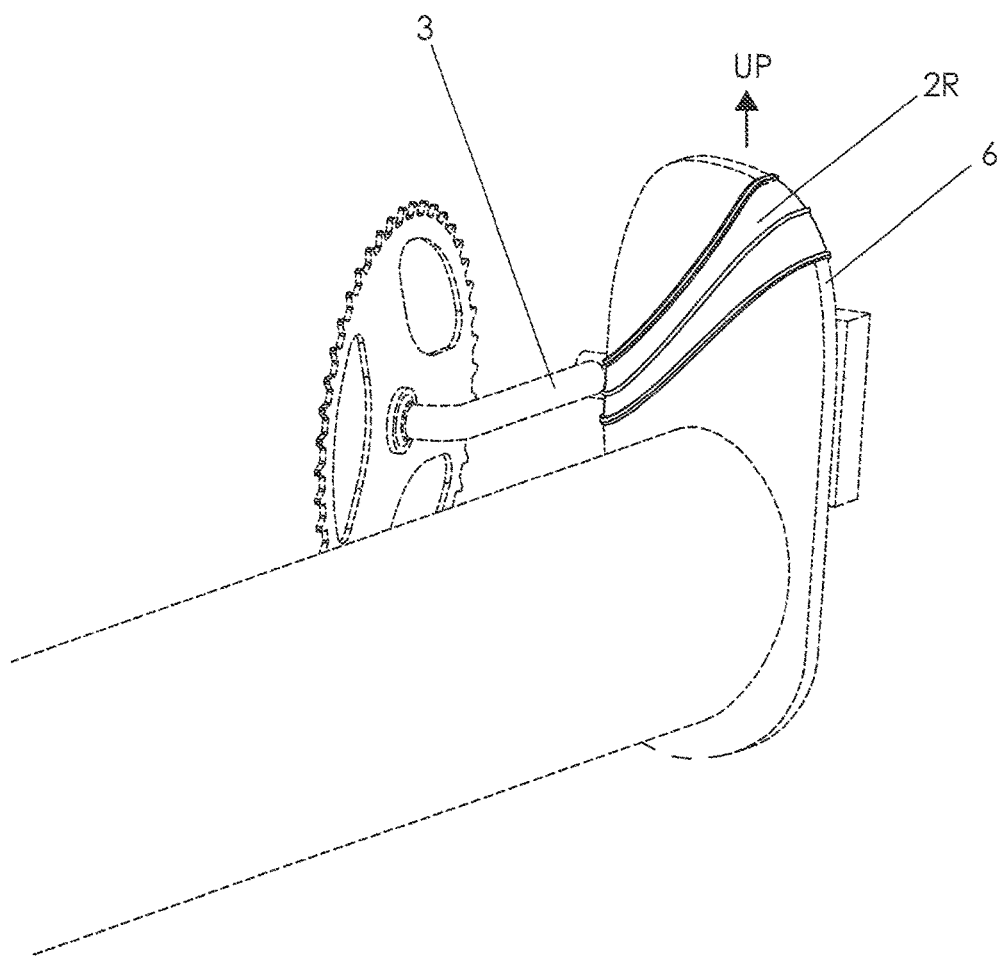
FIG. 11 is a top perspective view of the embodiment shown in FIG. 1A with the rider.
Figure 12:
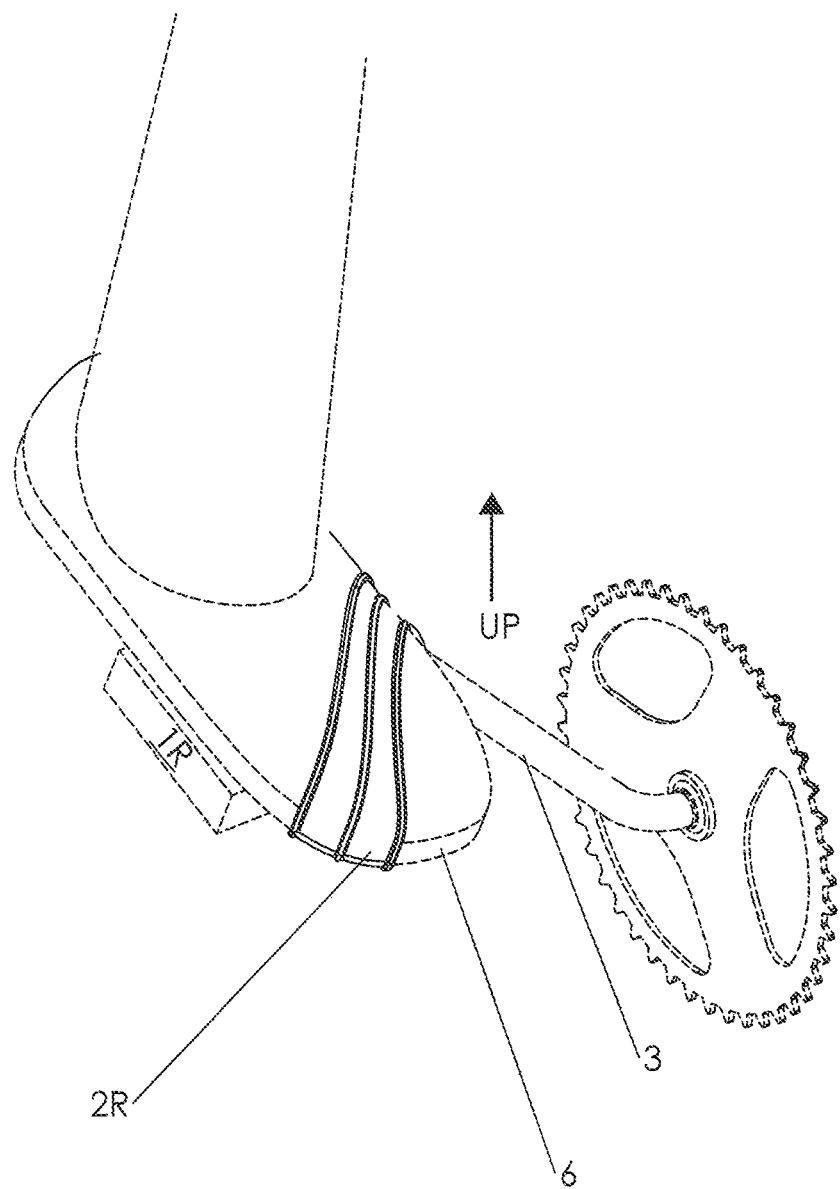
FIG. 12 is a front perspective view of FIG. 1A with the rider.

FIGS. 11 and 12 show the right axle strap 2R in use attached to crank arm 3. Rider foot 6 as the foot is rearward coming up will add a force vector up to the crank arm 3 by pushing up on the axle strap 2R.

Nominal Dimensions and Angles Follow:

Nominal dimensions include D1=about 0.50 (12.7 mm) to about 1.5 (38.1 mm); inch; D2=about 2.25 (57.15 mm) to about 3.0 inch (76.2 mm); D3=about 2.25 (57.15 mm) to about 3.0 inch (76.2 mm). Forward angle FA of the strap shown in FIG. 9 ranges from about 44° to about 60°.

Figure 13:
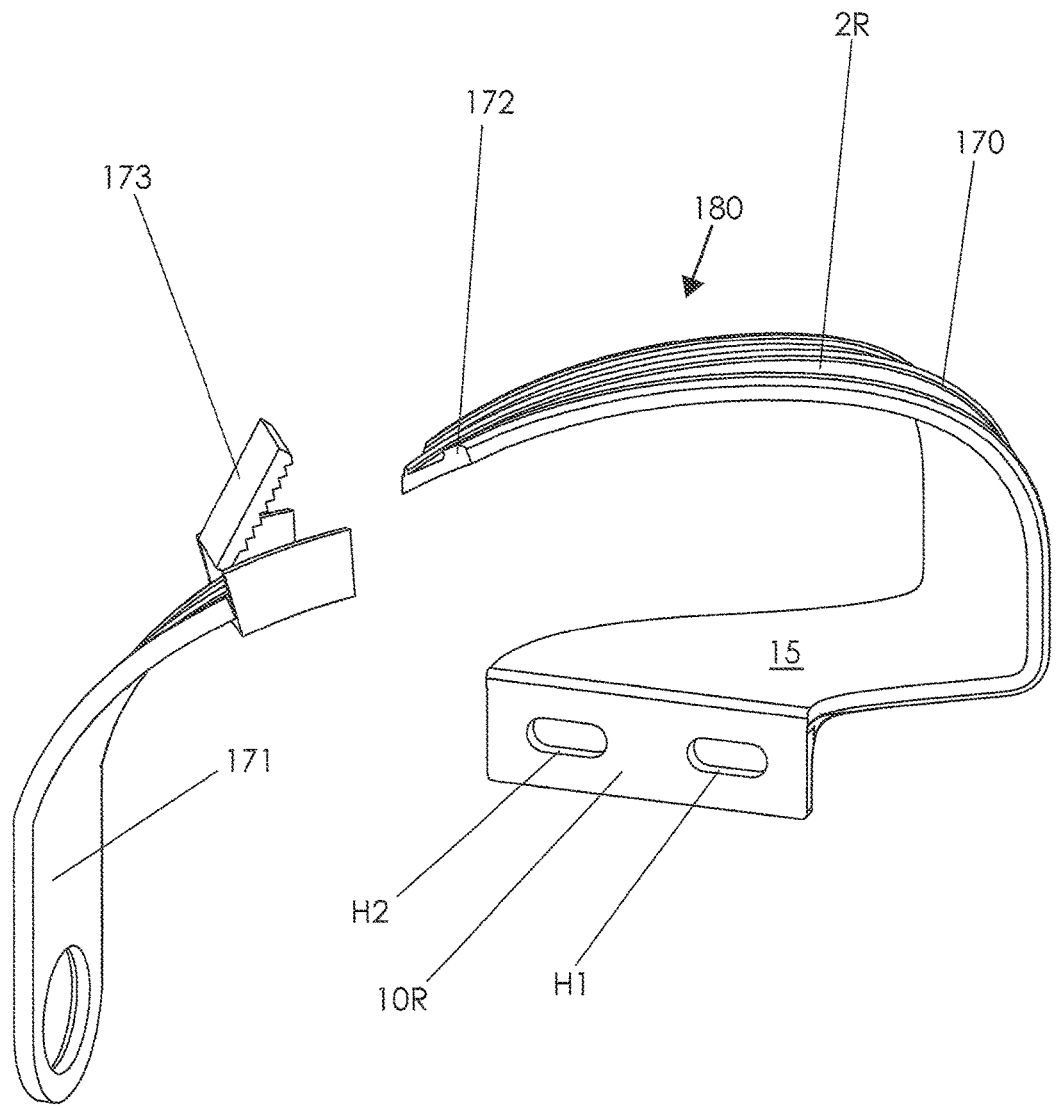
FIG. 13 is a front perspective view of a buckle strap embodiment.

Referring, last to FIG. 13 the diagonal strap 180 consists of a forward segment 170 that has a tip 172 that slides into buckle 173. The user can adjust the tension by pulling on tip 172. The axle segment 171 ends with buckle 173.

While a number of exemplifying features and embodiments have been discussed above, those of skill in the art will recognize certain modifications, permutations, additions and subcombinations thereof. No limitation with respect to the specific embodiments disclosed herein is intended or should be inferred.

I claim:

1. A diagonal pedal strap assembly comprising:
   a front flange shaped to fit across a forward face of a pedal;
   a fastener passing through a hole in the front flange functioning to secure the front flange to the forward face of the pedal;
   a forward projecting base attached to a top of the front flange;
   said forward projecting base having an outbound mount for the diagonal pedal strap;
   said diagonal strap sized to accommodate a user's shoe thereunder; and
   said diagonal strap having an inbound end that encircles a pedal axle.

2. The diagonal pedal strap assembly of claim 1, wherein all of the components but the fastener are made from a single plastic casting.

3. The diagonal pedal strap assembly of claim 2, wherein the fastener further comprises a locking bolt and nut.

4. The diagonal pedal strap assembly of claim 1, wherein the diagonal strap has a width ranging from 0.5 inch to 1.5 inch and has a thickness ranging from 0.100 to 0.150 inch.

5. The diagonal pedal strap assembly of claim 4, wherein a forward most tip of the diagonal strap extends in front of the forward face of the pedal 2.25 to 2.75 inch.

6. The diagonal pedal strap assembly of claim 5, wherein a height of the diagonal strap above a midpoint of the pedal axle ranges from 2.25 to 3.0 inch.

7. The diagonal pedal strap assembly of claim 6, wherein a forward angle of the diagonal strap relative to the pedal axle ranges from 44 to 60 degrees.

8. The diagonal pedal strap assembly of claim 7, wherein the diagonal strap further comprises longitudinal reinforced ridges.

9. The diagonal pedal strap assembly of claim 7, wherein the diagonal strap further comprises a forward segment adjustably connected to an axle segment via a buckle.

10. In combination with a pedal having a central axle and a front face, an improvement comprising:
    a front flange having a fastener to the front face;
    a rigid base projecting forward from a top of the front flange and having an attachment to a diagonal strap;
    said diagonal strap having a height to accommodate a user's shoe; and
    said diagonal strap having an axle loop around the central axle.

11. The improvement of claim 10 further comprising a one piece construction for the front flange, the rigid base, and the diagonal strap.

12. The improvement of claim 11 further comprising a construction from a group consisting of rubber and plastic.

13. The improvement of claim 12, wherein a forward most tip of the diagonal strap extends in front of the pedal front face in the range of 2.25 to 2.75 inch.

14. The improvement of claim 13, wherein a forward angle of the diagonal strap relative to the central axle ranges from 44 to 60 degrees.

15. The improvement of claim 14, wherein the diagonal strap further comprises a two segment strap connected with a buckle.

16. A method to secure a foot to a pedal, the method comprising the steps of:
    forming a front flange of a diagonal pedal strap to conform to a front face of the pedal;
    securing the front flange to the front face of the pedal;
    forming a rigid base extending forward from a top edge of the front flange;
    securing the diagonal pedal strap to an outbound forward segment of the rigid base;
    forming a round hole in an inbound end of the diagonal pedal strap;
    placing the round hole around a pedal axle; and
    threading the pedal axle into a crank arm.

17. The method of claim 16 further comprising the step of forming the diagonal strap with two segments connected by a buckle to enable a strap tension adjustment.

* * * * *